D. POPOV.
WHEELED SCRAPER.
APPLICATION FILED JAN. 29, 1920.
1,363,435.
Patented Dec. 28, 1920.
2 SHEETS—SHEET 1.
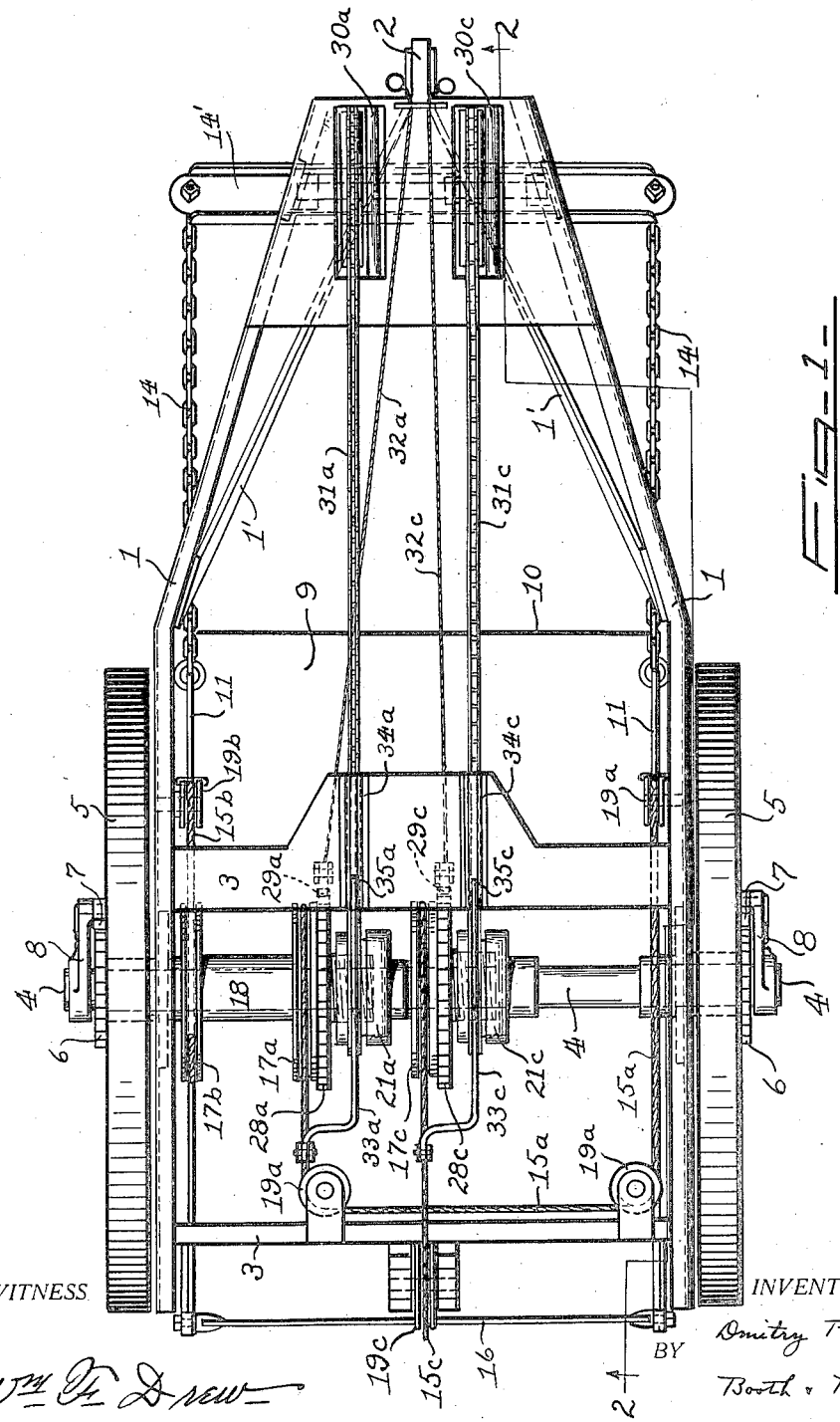

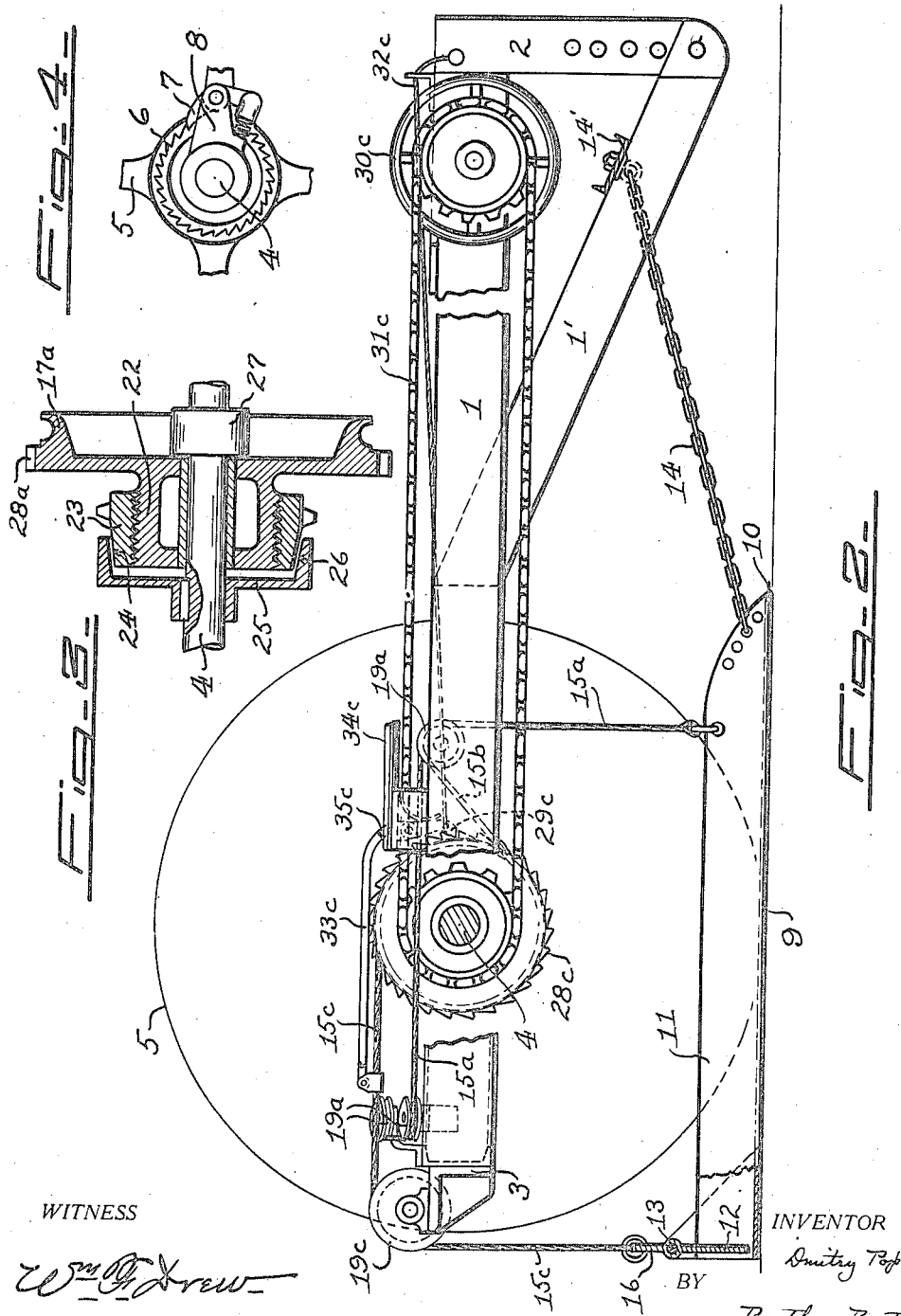

UNITED STATES PATENT OFFICE.

DMITRY POPOV, OF BERKELEY, CALIFORNIA.

WHEELED SCRAPER.

1,363,435.  Specification of Letters Patent.  Patented Dec. 28, 1920.

Application filed January 29, 1920. Serial No. 354,971.

*To all whom it may concern:*

Be it known that I, DMITRY POPOV, a citizen of Russia, residing at Berkeley, in the county of Alameda and State of California, have invented certain new and useful Improvements in Wheeled Scrapers, of which the following is a specification.

My invention relates to wheeled scrapers adapted to scrape, lift, carry, and dump loose material of any kind, such for example as earth.

The object of my invention is to provide a scraper of the described type which can be easily handled, and by means of which loose material, such as earth, may be efficiently transported for considerable distances. To this end I provide means for lifting the bucket of my scraper, with its load, entirely off the ground, so that it may be moved without unnecessary friction. This lifting is accomplished by the forward movement of the implement, through mechanism to be fully described hereinafter, and is both manually and automatically controlled. Moreover, by means of the same mechanism, I am able to adjust the height and inclination of the bucket, and to tilt the same for the purpose of dumping its load.

My invention will now be fully described with reference to the accompanying drawings, wherein—

Figure 1 is a plan view of my complete machine.

Fig. 2 is a broken vertical section taken approximately on the irregular line 2—2 of Fig. 1.

Fig. 3 is a sectional detail, enlarged, of the clutch mechanism.

Fig. 4 is a detailed elevation of one of the overrunning wheel-ratchets.

In the drawings, the reference numeral 1, Figs. 1 and 2, designates a frame, which is composed of two side members converging at the front and secured to a suitable draft head 2, and braced thereto by diagonal braces 1'. Cross members 3 hold the side members in spaced relation. Toward the rear of the frame is a rotatably mounted axle shaft 4, whose ends carry supporting ground running wheels 5. Said wheels are preferably rotatably mounted upon the axle ends, and connected thereto by overrunning ratchet clutches, each comprising a ratchet wheel 6, Figs. 1 and 4, secured to the wheel 5, and an engaging pawl 7 carried by a radial arm 8 fixed upon the axle end. Either one of the wheels 5 is thereby permitted to run ahead of the axle shaft 4 in rounding turns.

Beneath the frame 1 is carried a scraper bucket 9, Figs. 1 and 2, having a forward cutting edge 10, sides 11, and a back 12. In the preferred form of my device herewith illustrated, I make the back 12 as a hinged dump gate, pivoted at 13, Fig. 2, in such a manner that its lower portion can swing outwardly to permit the dumping of the material within the bucket.

The bucket 9 is connected with a cross member 14' secured to the frame braces 1' by drag chains 14, Figs. 1 and 2, but its weight is entirely borne by suspending chains or flexible cables $15^a$, $15^b$ and $15^c$. In the drawings I have shown these as cables, but it is obvious that chains may be used, this point being solely a matter of mechanical practice. Likewise, I have shown three such suspending cables, $15^a$, $15^b$ and $15^c$, but it will be seen that a greater number may be used, depending on the size and form of the bucket.

The cables $15^a$ and $15^b$ support the two forward corners of the bucket, and the cable $15^c$ is secured to the upper portion 16 of the dump gate 12 above its pivot 13, and supports the rear of the bucket. Thus, by raising and lowering the various cables the bucket can be held in any desired position for scraping the ground surface, or raised entirely off the ground for carrying a load for any desired distance, and, by raising the forward cables $15^a$ and $15^b$ considerably higher than the rear cable $15^c$, the dump gate 12 is automatically opened, allowing the material contained within the bucket to be dumped out the rear.

The cables are wound upon drums mounted upon the axle shaft 4, and the raising and lowering of said cables is accomplished by the rotation of said drums, power being applied thereto by the rotating axle itself. The forward cables $15^a$ and $15^b$ are wound upon the drums $17^a$ and $17^b$, Fig. 1, respectively, both being mounted upon a common hub or sleeve 18 rotatable upon the axle. Said cables pass over and are guided by suitably mounted sheaves $19^a$ and $19^b$, respectively, there being three sheaves $19^a$ for guiding the cable $15^a$ from the bucket to its drum $17^a$, and one sheave $19^b$ for the cable 15ᵇ. The rear cable 15ᶜ passes over a sheave 19ᶜ, Figs. 1 and 2, and is wound upon a drum 17ᶜ, rotatably mounted upon the axle shaft 4, and separate from the drums 17ᵃ and 17ᵇ.

A clutch mechanism 21ᵃ, Fig. 1, is provided for connecting the common hub 18 of the drums 17ᵃ and 17ᵇ in driving relation with the axle 4, and another clutch mechanism 21ᶜ is fitted for the drum 17ᶜ. Both of said clutches are identical in construction and operation, and therefore only one is shown in detail in Fig. 3 of the drawings, and will be described herein. The drum has extending from it a threaded hub 22, Fig. 3, upon which fits a nut 23 having a conical end portion 24. Secured to the axle shaft is a spider or disk 25, having a female conical portion 26 adapted for engagement with the male conical portion 24 of the nut 23. A thrust collar 27 is secured to the axle shaft 4 on the other side of the cable-drum 17ᵃ. Thus, by turning the nut 23 upon the drum hub 22 in one direction, the conical faces 24 and 26 are brought into engagement, and the drum is locked upon the shaft and rotates with it; and by rotating the nut upon the hub 22 in the other direction, the drum is freed from the shaft, and remains stationary. The drums 17ᵃ and 17ᶜ are provided with ratchets 28ᵃ and 28ᶜ, Figs. 1, 2 and 3, which are engaged by pawls 29ᵃ and 29ᶜ, Figs. 1 and 2, respectively, to prevent the weight of the bucket from causing backward rotation of said drums when released from the axle shaft.

Control of the clutches is had from the forward part of the machine by means of hand wheels 30ᵃ and 30ᶜ, connected by chains 31ᵃ and 31ᶜ, respectively with the nuts 23 of the clutches 21ᵃ and 21ᶜ. The pawls 29ᵃ and 29ᶜ are released, to permit the bucket to be lowered by its own weight, by cords 32ᵃ and 32ᶜ respectively.

By the operation of said hand wheels, the bucket may be raised to any desired height, or tilted, fore and aft, to any desired angle. However, I provide an automatic safety release for the clutches, to prevent damage to the machine by attempting to raise the bucket too high. This comprises slidable rods 33ᵃ and 33ᶜ, attached at their rear ends to the horizontal portions of the cables 15ᵃ and 15ᶜ respectively, and extending forwardly and resting, at their forward ends, upon stationary horizontal guides 34ᵃ and 34ᶜ supported by the forward frame cross member 3 in vertical alinement above the chains 31ᵃ and 31ᶜ respectively. The forward ends of said rods are provided with downwardly turned fingers 35ᵃ and 35ᶜ, adapted to engage the upper runs of the chains 31ᵃ and 31ᶜ respectively, when said rods ride beyond and drop from the forward ends of their respective guides 34ᵃ and 34ᶜ. Thus, for example, when the clutch 21ᶜ is engaged, by turning its controlling hand-wheel 30ᶜ toward the rear, the cable 15ᶜ winds upon the drum 17ᶜ, and the release rod 33ᶜ moves forwardly until its forward portion drops off the guide 34ᶜ, allowing the finger 35ᶜ to engage the control chain 31ᶜ. The chain is, of course, also moving, because its clutch is engaged and rotating with the axle and the drum 17ᶜ, but on account of the difference in diameter between said drum 17ᶜ and the sprocket over which the chain runs, the release rod 33ᶜ, which is secured to and moved by the cable 15ᶜ, moves faster than the normal rate of speed of the chain, and therefore moves said chain ahead and causes the release of the clutch. Thus the release of the clutches, and consequently the stopping of the upward movement of the bucket, is automatically effected.

My invention is herewith illustrated and has been herein described in its preferred form. It is to be understood, however, that minor changes may be made in the form and construction of the device, within the scope of the claims hereto appended, without in any way departing from the spirit of the invention.

I claim:—

1. A wheeled scraper comprising a pair of supporting wheels; a shaft rotated thereby; a drum rotatably mounted upon said shaft; a clutch for connecting said drum in driving relation with said shaft; a scraper bucket; a flexible suspension member for supporting said bucket, said suspension member being adapted for winding upon said drum to vary the height of said bucket; and means associated with said suspension member and actuated by the movement thereof for automatically releasing said clutch.

2. A wheeled scraper comprising a pair of supporting wheels; a shaft rotated thereby; a plurality of independent drums rotatably mounted upon said shaft; a clutch for connecting each drum in driving relation with said shaft; a scraper bucket; and a plurality of independent flexible suspension members for supporting said bucket, each of said suspension members being adapted for winding upon a drum to vary the height and inclination of the bucket.

3. A wheeled scraper comprising a pair of supporting wheels; a shaft rotated thereby; a plurality of independent drums rotatably mounted upon said shaft; a clutch for connecting each drum in driving relation with said shaft; a scraper bucket; a plurality of independent flexible suspension members for supporting said bucket, each of said suspension members being adapted for winding upon a drum to vary the height and inclination of the bucket; devices for retaining said drums against rotation in one direction; and means for separately controlling said retaining devices to change the inclination of the bucket.

4. A wheeled scraper comprising a frame; a pair of supporting wheels; a shaft rotated by said wheels; a drum rotatably mounted upon said shaft; a clutch for connecting said drum in driving relation with said shaft; a rotary controlling member associated with said clutch; a hand wheel mounted on the frame for operating said controlling member; an endless chain connecting said hand wheel with said controlling member; a scraper bucket; a flexible suspension member for supporting said bucket, said suspension member being adapted for winding upon said drum to vary the height of said bucket; and means actuated by the movement of said suspension member for engaging said endless chain, to automatically operate said clutch controlling member.

In testimony whereof I have signed my name to this specification.

DMITRY POPOV.